US008799819B2

(12) United States Patent
Sauer et al.

(10) Patent No.: US 8,799,819 B2
(45) Date of Patent: Aug. 5, 2014

(54) GRAPHICAL USER INTERFACE FOR MULTI-TAP DELAY

(75) Inventors: Thomas Sauer, Rellingen (DE); Stefan Gretscher, Hamburg (DE)

(73) Assignee: Apple Inc., Cupertino, CA (US)

( * ) Notice: Subject to any disclaimer, the term of this patent is extended or adjusted under 35 U.S.C. 154(b) by 2226 days.

(21) Appl. No.: 11/713,232

(22) Filed: Mar. 1, 2007

(65) Prior Publication Data

US 2008/0212667 A1 Sep. 4, 2008

(51) Int. Cl.
*G06F 3/048* (2013.01)

(52) U.S. Cl.
USPC ............................ 715/833; 715/830; 715/863

(58) Field of Classification Search
USPC .......................................... 715/833, 827, 830
See application file for complete search history.

(56) References Cited

U.S. PATENT DOCUMENTS 5,040,220 A 8/1991 Iwamatsu
5,227,771 A * 7/1993 Kerr et al. ..................... 715/800
5,581,681 A * 12/1996 Tchao et al. .................. 715/234
6,222,549 B1 4/2001 Hoddie
7,765,491 B1 * 7/2010 Cotterill ........................ 715/833
7,934,169 B2 * 4/2011 Reponen ....................... 715/833
2002/0109710 A1 * 8/2002 Holtz et al. ................... 345/723
2007/0162355 A1 * 7/2007 Tabin ............................. 705/27
2007/0234236 A1 * 10/2007 Champion et al. ............ 715/833

FOREIGN PATENT DOCUMENTS

DE 10 2005 043 641 A 11/2006
GB 2 357 409 A 6/2001

OTHER PUBLICATIONS

PSPaudioware, PSP 608 MultiDelay 8-Tab Multimode Delay Processor http://www.soundonsound.com/sos/may06/articles/psp608.htm.*
Jerry Joyce, Windows Vista Plain & Simple (2006).*
M-Audio, Oxygen Series Oxygen 8 v2 User Guide ( Feb. 7, 2006) http://www.m-audio.com/images/global/manuals/051014_OxyLine_UG-EN01_V1.PDF.*
Gary W. Johnson, LabVIEW Graphical Programming, Fourth Edition (Jul. 17, 2006).*
Alberto, Spectran V2 (Nov. 9, 2004), http://web.archive.org/web/20041109054643/http://digilander.libero.it/i2phd/spectran.html.*
PCT International Search Report and Written Opinion, mailed Jul. 11, 2008, (13 pages).

* cited by examiner

*Primary Examiner* — Amy Ng
*Assistant Examiner* — Di Xiao
(74) *Attorney, Agent, or Firm* — Fletcher Yoder P.C.

(57) ABSTRACT

A multi-tap delay has a graphical user interface in which each delay tap is represented by a bar on a time line. The bars are oriented across the time line, the position of each bar on the time line specifying the amount of delay time of the represented delay tap. The length of each bar specifies the value of another parameter of the represented delay tap.

34 Claims, 3 Drawing Sheets

GRAPHICAL USER INTERFACE FOR MULTI-TAP DELAY

BACKGROUND OF THE INVENTION

1. Field of the Invention

The present invention relates to a multi-tap delay, and more particularly to a graphical user interface of a multi-tap delay. More specifically, the invention relates to such a multi-tap delay with its use in a computer aided music synthesizing and recording process and computer program.

Audio delays have widespread use in sound studios and sound design and have been used since the time dating from the earliest recording devices. A delay is a sound effect that splits the signal into two or more parts and then delays one part by a set time and then recombines it with the original. Thus, a delay plays a copy of the original signal following a delay of a certain amount of time, creating an echo effect. The delay time may range, for example, from several milliseconds to several seconds. A delay may also have a feedback option which takes the output of the delay and sends it back to the input. The sound is then repeated over and over, and—assuming that the feedback gain is less than one—becomes quieter each time it plays back, which enhances the echo effect.

While a single delay involves only one single echo, which is repeated according to the feedback settings, a multi-tap delay in effect is multiple delays in one, where each delay has a separate delay time. Multi-tap delays facilitate the creation of more complex patterns and can add rhythmic quality to an instrument.

FIG. 1 is a diagram showing a 4-tap delay unit, where the delay line is "tapped" at four different points, that is four outputs are taken within the delay line, before the signal has been delayed for the total delay time. The amount of delay between the various taps can be different. The multi-tap delay in FIG. 1 also comprises a feedback at the end of the delay line.

2. Background

Most delay devices are digitally based today. A multi-tap delay may be implemented as a dedicated device, which then in general has physical controls like sliders and rotary knobs to set the delay time of each tap, as well as other parameters like the level, a pan, a low pass and/or high pass filter etc. of the tap. These devices often in addition include displays for outputting the parameter values to the user.

In cases where multi-tap delays are implemented entirely in software (sometimes as plug-ins of other sound-editing programs), in general all the parameter values of the different taps are presented to the user on a graphical user interface. The user sets the parameters through a keyboard or with the help of controls provided by the graphical user interface, the graphical user interface often imitating the appearance and the arrangement of the physical controls of a dedicated device with its sliders, rotary knobs and buttons. An example of such a graphical user interface in shown in FIG. 2. The controls are operated by the user by dragging the mouse pointer, for example.

However, conventional multi-tap delays, implemented as dedicated devices or in software imitating the appearance of dedicated devices, have a number of disadvantages: Where the parameter settings of the various taps are indicated to the user by the position of rotary knobs or the content of a textual display, it is difficult for the user to grasp the different settings with one look. Although sliders, often used in multi-tap delays for setting the time delay of a tap, are capable of quickly indicating to the user the parameter value they control, they are so space-consuming that the number of taps is very limited if every tap is to be equipped with one or more associated sliders. Particularly in graphical user interfaces, the content of textual displays cannot easily be set by the user with the mouse, and the operation, with the help of the mouse, of other controls like arrow keys or rotary knobs is cumbersome. Furthermore, the user cannot modify the parameter settings of several taps at the same time.

SUMMARY OF THE DESCRIPTION

At least certain embodiments of the invention provide a multi-tap delay that allows a user to intuitively grasp the audible effect of and to edit the values of tap parameters.

In one embodiment a multi-tap delay is displayed on a data processing system, and in the multi-tap delay, each delay tap is represented by a bar on a time line, the bars being oriented across (e.g. perpendicularly to) the time line, the position of each bar on the time line specifying the amount of delay time of the represented delay tap, and the length of each bar specifying the value of another parameter of the represented delay tap.

In a preferred embodiment, each bar on the time line specifies the value of the same parameter type of the taps. It is advantageous to provide a switch for each bar in order to switch the respective parameter ON or OFF. Such a switch may be a toggle switch displayed above each tap, respectively.

With such a representation of delay taps on a display, not only the number and the time delays of a multitude of taps is visualized for the user, but also the audible effect of another parameter of each of the taps, for example their levels.

In a preferred embodiment of the invention, the time line is horizontally oriented and the bars are vertically oriented. This supports the user's intuitive understanding of the delay time setting, because the horizontal orientation corresponds to usual representation of a time line. Furthermore, the delay time may be synchronized to the tempo of a sequencer. Additionally, it is also possible to use a grid such as a music grid for the positions which are allowed for taps. For example, the positions of the taps may be quantized.

In another preferred embodiment of the invention, the length of each bar can be manipulated by the user, thereby setting or modifying the parameter value of the delay tap specified by the length of the bar.

By adjusting, for example with the mouse, the length of a bar instead of editing a text field, the user is given a comfortable and intuitive way of setting tap parameter values.

In a further embodiment of the invention, multiple selected bars can be manipulated by the user at the same time, thereby setting or modifying the parameter values of multiple delay taps in an analogous way.

This allows the user to modify the parameter settings of multiple delay taps simultaneously in the same way, for example to reduce the level of all taps by 5 dB.

In one embodiment of the invention, modifying the length of one of a group of selected bars modifies the lengths of the other bars in the group simultaneously. This modification may be made either in a relative manner or in an absolute manner depending on the parameter.

Thus, in a possible embodiment modifying parameters in an analogous way means modifying the parameters in a relative manner. For example, reducing the level of one of a group of bars by 50% will reduce the level of all bars in the group by 50%. However, it is also possible to modify the length based on absolute values.

In one embodiment of the invention, the length of the bars can be adjusted by drawing a line across several bars.

Drawing with a mouse pointer, a pen or a finger makes the editing process for a group of adjacent taps more easy and intuitive.

The parameter whose value is specified for each delay tap by the length of the bar representing the delay tap may be, for example, the output level of the delay tap, the frequency band that passes a high pass filter or a low pass filter of the delay tap, or the resonance of a low pass filter and/or a high pass filter of the delay tap.

The parameter whose value is specified for each delay tap by the length of the bar representing the delay tap may also be the absolute pan value of the tap. In this case, each bar extends away from a center line, one side of the center line representing a left pan, the other side of the center line representing a right pan. An area around the pan position may represent the spread in case of a stereo signal. In case of a surround output the pan bar may additionally represent properties of the surround output by an angle.

Thus, the bar is capable not only of indicating the absolute value of a parameter, namely by its length, but also the sign of the parameter value (positive or negative), namely by its position on the one side or on the other side of a center line.

Whereas in the above case the two sides of the center line represent a right or left pan, in another case, where the parameter whose value is specified for each delay tap by the length of the bar representing the delay tap is the absolute value of the pitch transposition of the delay, one side of the center line represents pitch up, the other side of the center line represents pitch down.

In an embodiment of the invention, the parameter whose value is specified for each delay tap by the length of the bar representing the delay tap is the frequency band that passes a band pass filter of the tap, said pass frequency band being additionally specified by the position of the bar relative to the direction perpendicular to the time line.

Thus two parameters, namely the settings of the low pass filter and of the high pass filter of a delay tap, where the two filters are arranged in series, can be represented in a single bar.

In a similar embodiment of the invention, the parameter whose value is specified for each delay tap by the length of the bar representing the delay tap is the frequency band cut off by a band reject filter of the tap, said cut off frequency band being additionally specified by the position of the bar relative to the direction perpendicular to the time line.

Also here, the settings of the low pass filter and of the high pass filter of a delay tap are represented in a single bar, but the filters are arranged in parallel.

In a further embodiment of the invention, the parameter whose value is specified for each delay tap by the length of the bar representing the delay tap and its position relative to the direction perpendicular to the time line in general is the frequency band that passes a band pass filter of the tap, but becomes the frequency band cut off by a band reject filter of the tap as soon as the high pass filter cutoff frequency becomes greater than the low pass filter cutoff frequency. This embodiment combines the representation of the parameters values of the low pass filter and of the high pass filter of the tap, and in addition the operation of the filters is switched automatically from serial to parallel according to the parameter settings.

In another embodiment of the invention, the low pass filter cutoff frequency and the high pass filter cutoff frequency can be modified together by moving the bar in one of the two directions perpendicular to the time line.

In this embodiment, the user can modify the values of two parameters of a delay tap with a single action of the mouse or a similar input device.

In an embodiment of the invention, the length of a bar can specify the value of one of a variety of parameters, the parameter whose values are currently specified by the bars being selectable by the user.

This way, virtually all parameters of the delay taps can be indicated to the user with the help of a single display containing the bars on a time line. Thus, no other controls or displays are necessary for indicating the parameter settings of the delay taps to the user, resulting in user interfaces that—although they are capable of controlling a multitude of delay taps with a multitude of parameters—are concise and clearly laid out.

One embodiment of the invention may be implemented as a computer program comprising computer program code which, when executed on a computer, implements the multi-tap delay described above.

Such a computer program element may, for example, be stored on a data storage device such as a CD, a DVD, or other optical media, a semiconductor memory (e.g. flash memory) or a hard disk or other magnetic media or the main memory (e.g. DRAM) of a computer. However, the invention may not only be used for multi-taps implemented in software, but also for improving the displays of dedicated multi-tap delay devices. If the display is shown on a touch screen, the user can adjust the length or the location of the bars with a pen or his finger instead of the mouse.

BRIEF DESCRIPTION OF THE DRAWINGS

The foregoing and other objects, aspects and advantages of the invention will be better understood from the following detailed description of preferred embodiments of the invention with reference to the drawings, in which.

DETAILED DESCRIPTION

Figure 1:
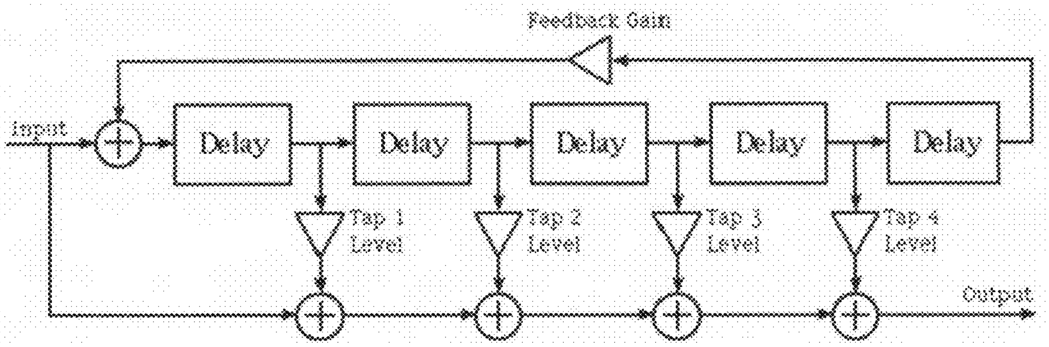
FIG. 1 is a diagram showing the structure of a 4-tap delay.
Figure 2:
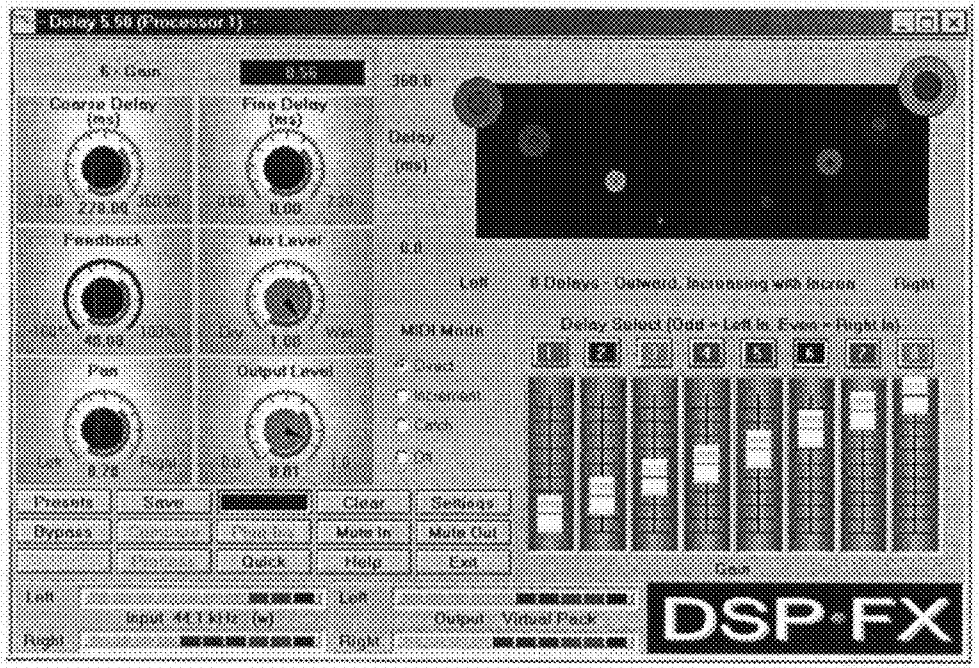
FIG. 2 shows the graphical user interface of a multi-tap delay according to the state of art.
Figure 3:
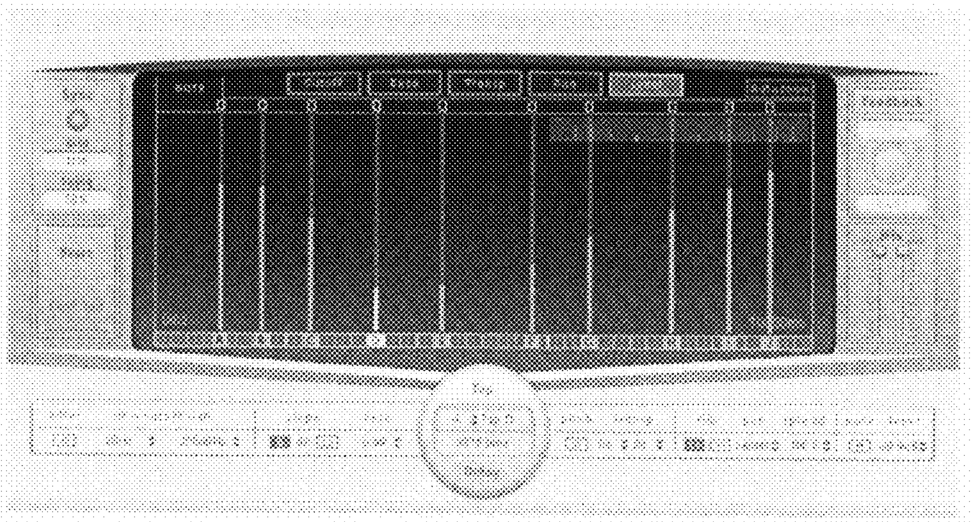
FIG. 3 shows the graphical user interface of a multi-tap delay according to the invention, where the currently selected parameter type is "Level"

Referring now to the drawings, FIG. 3 shows the graphical user interface of a multi-tap delay realized entirely in software. In this embodiment of the invention, the multi-tap delay features up to 26 taps with up to 10 seconds delay time per tap.

Taps and their parameters can be edited graphically using the tap display area, which consists of several sections: The large screen area between the bottom bar and the top bar represents tap parameter values like level, filter cutoffs, resonance or pan/balance as vertical value bars. The distance of a bar from the left edge of the tap display corresponds to the delay time of a tap, so that the horizontal lines of the tap display, like the bottom bar or the top bar, can be regarded as a time line. By grabbing (for example, with a mouse click/hold) or otherwise selecting a tap in the display, the tap can be moved to the left (backwards in time) and to the right (forwards in time), editing its delay time in the process. A horizontal bar on the bottom contains tap handles with the tap identification names A to Z. The parameter whose value for each tap is currently indicated by the length of each vertical bar can be selected by the user by means of the buttons labeled “Cutoff”, “Reso”, “Level”, “Transp” and “Pan” above the top bar. The button corresponding to the currently displayed parameter type is highlighted (“Level” in the case of FIG. 3 and “Pan” in the case of FIG. 4). The label of the tap display area may change with the selected parameter type, for example decibel (dB) values for “Level”, hertz (Hz) values for certain filters etc. In addition, the color of the value bars preferably changes with currently selected parameter type.

The tap parameter area underneath the tap display area indicates in numerical form the parameter values of a selected tap, including the delay time. The parameter values can be set and modified here with the help of the keyboard or with controls like arrow keys, for example. The currently selected tap, whose parameter values are shown in the tap parameter area, is highlighted in the tap display area.

Alternatively to editing the parameter values numerically in the tap parameter area, they can be edited graphically in the tap display area by grabbing or otherwise selecting the ends of the vertical value bar of a tap and then lengthening or shortening it. Editing a parameter value graphically in the tap display area changes also the value in the corresponding text field of the tap parameter area and vice versa. The user can modify the parameter values of multiple selected taps at the same time. Multiple selection is created in the tap display area, for example, by clicking on several taps while holding the Shift or other key or by click dragging in the background of the tap display area. Grabbing the end of one of the group of selected value bars and lengthening or shortening it will lengthen or shorten all value bars in the group accordingly. This may be done by changing all value bars by the same absolute value, for example by shortening all of them by 10 pixels, or by the same relative value, for by example shortening all them by 25%. The user can edit the value of several adjacent bars also by, for example, drawing an (imaginary) line with a sweeping movement of the mouse pointer in the tap display area across several taps, like a brush on a paper. The height of each bar whose vertical line is crossed by the mouse pointer movement is then adjusted to the (imaginary) line that was drawn by the movement. Alternatively, it is also possible to draw straight lines using a dedicated mode in order to adjust all taps to this straight line.

In FIG. 3, 10 taps A to J are configured. The currently selected parameter type is “Level”. Accordingly, the length of the value bars corresponds to the output level of each tap in decibel. It is possible to e.g. indicate 0 dB by a reference line which is perpendicular to the vertical bars. The taps configured in FIG. 3 at first get softer as time progresses and then louder towards the end of the tap pattern. The level is adjusted graphically by grabbing or otherwise selecting the single bar handle and moving it up starting from the bottom. In the same way, other parameter types like cutoff frequency of a high pass or low pass filter or its resonance value can be graphically displayed and edited.

Figure 4:
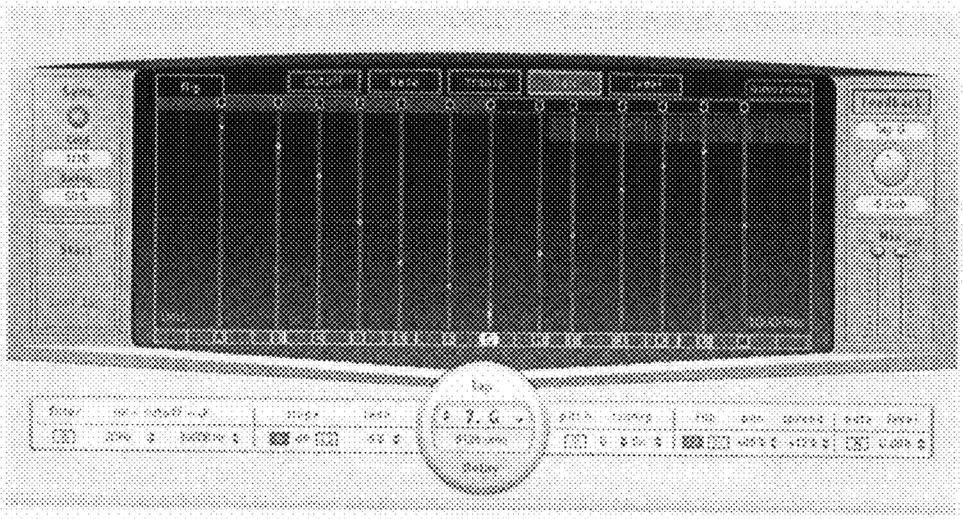
FIG. 4 shows the graphical user interface of a multi-tap delay according to the invention, where the currently selected parameter type is "Pan"

FIG. 4 shows the user interface of the multi-tap delay with a similar tap pattern as in FIG. 3, but where the currently selected parameter type is “Pan” as shown in the top bar of buttons. In case of a stereo input the pan position may, for example, be indicated by a dot positioned in relation to a center pan line located in the middle of the display. Moving it up will result in a left pan (taps A to C among others), moving it down results in a right pan (taps E to I among others). For example in the case of a stereo input, a bar attached to the pan dot may be used to indicate the stereo spread. The bar may be split in two differently colored halves to indicate the left and right sides of the stereo input signal. The spread width may be adjusted by grabbing and dragging handles on either side of the colored bar serving as a spread bar. In this way the spread bar can be changed symmetrically around the pan position dot. The larger the spread bar, the wider is the stereo width of the input signal. When moving either one of the spread bar handles to the other side of the pan position dot, the stereo inputs are reserved.

On the other hand, in case of a mono input the pan position for each tap may be visualized by a pan value bar starting from the center pan line in the middle of the display. The pan parameter value is thus not only determined by the length of the value bar, but in addition by its location with respect to the center line (above or below). In the same way, other parameter types whose values can have a negative sign can be displayed and edited, like pitch transposition for example.

Figure 5:
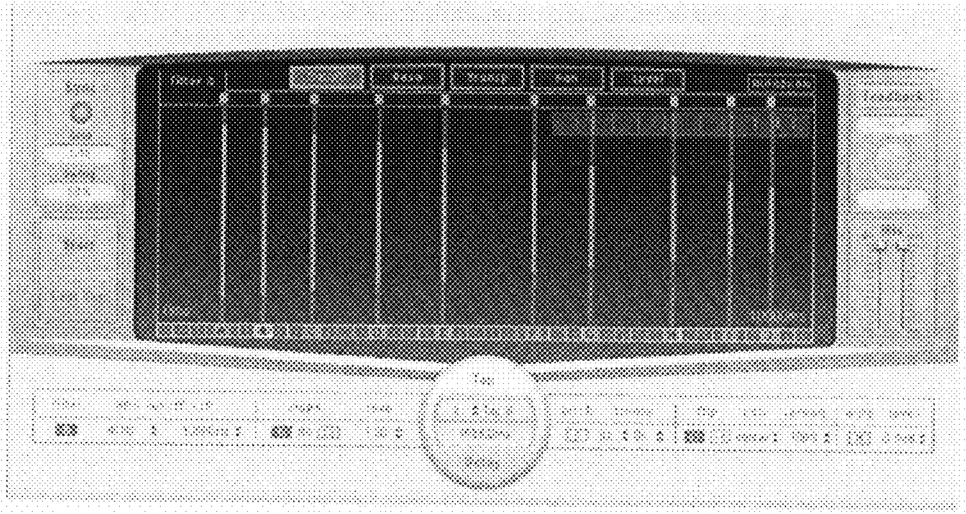
FIG. 5 shows the graphical user interface of a multi-tap delay according to the invention, where the currently selected parameter type is "Cutoff".

FIG. 5 shows the user interface of the multi-tap delay with the same tap pattern as in FIGS. 3 and 4, but where the currently selected parameter type is “Cutoff”. The cutoff frequencies of the high-pass filter and the low-pass filter of a tap can be displayed and edited using two value bars in conjunction. Starting from the bottom of the display, the high-pass cutoff is raised. Starting from the top, the low-pass cutoff is lowered. The area between the handle of the high-pass filter and the handle of the low-pass filter can be regarded as one value bar with two handles, one at the bottom and one at the top. This one value bar, by virtue of its length, and in addition by virtue of its vertical position, specifies the value of two parameters, namely the high-pass frequency and the low-pass cutoff frequency. Dragging the area between the two cutoffs (that is the one value bar) in vertical direction adjusts the two cutoff values together. As long as the high-pass cutoff frequency is lower than the low-pass cutoff frequency, the high-pass filter and the low-pass filter are switched in series, building a band-pass filter, and the one value bar with the two handles specifies the frequency band that passes the band pass filter. In FIG. 5, the frequency band is getting narrower with each tap. Once the two handles cross each other, so that the high-pass cutoff frequency becomes greater than the low-pass cutoff frequency, the filters automatically switch from serial to parallel operation, resulting in a band reject filter. The one value bar between the two cutoffs then specifies the frequency band cut off by the band reject filter. This is indicated to the user by a change of the color or optical appearance of one value bar. In FIG. 3 the solid bright area of the bar indicates the audio being passed, whereas the gray dark area indicates the audio being filtered. When the high-pass cutoff is lowered above the low-pass cutoff frequency again, filter operation switches back to serial.

The time delay values for the individual taps or bars as well as the parameter values represented by the lengths and of the bars (possibly in two directions) are automatically stored in the corresponding memory position in the data processing system’s memory or the external memory whenever the representation of these variables is adjusted.

A result of at least certain embodiments of the invention may be a data file, created through one of the methods described herein, which may be stored on a storage device of a data processing system. The data file may be an audio data file, in a digital format, which may be used to create sound by playing the data file on a system which is coupled to audio transducers, such as speakers.

One or more of the methods described herein may be implemented on a data processing system which is operable to execute those methods. The data processing system may be a general purpose or special purpose computing device, or a desktop computer, a laptop computer, a personal digital assistant, a mobile phone, an entertainment system, a music synthesizer, a multimedia device, an embedded device in a consumer electronic product, or other consumer electronic devices. In a typical embodiment, a data processing system includes one or more processors which are coupled to memory and to one or more buses. The processor(s) may also be coupled to one or more input and/or output devices through the one or more buses. Examples of data processing systems are shown and described in U.S. Pat. No. 6,222,549, which is hereby incorporated herein by reference.

The one or more methods described herein may also be implemented as a program storage medium which stores and contains executable program instructions for, when those instructions are executed on a data processing system, causing the data processing system to perform one of the methods. The program storage medium may be a hard disk drive or other magnetic storage media or a CD or other optical storage media or DRAM or flash memory or other semiconductor storage media or other storage devices.

The invention claimed is:

1. A method to provide a graphical user interface, comprising:

displaying one or more delay tap controls on a display device, wherein a position of a delay tap control along a first direction controls a first parameter of audio properties, and a length of the delay tap control that is cross-wise to the first direction controls a second parameter of audio properties;

receiving a manipulation of a first edge of the delay tap control or a second edge of the delay tap control relative to a second direction perpendicular to the first direction; and setting the second parameter in response to the manipulation, wherein the first edge defines an upper boundary for the second parameter of the delay tap, and the second edge defines a lower boundary for the second parameter of the delay tap.

2. A method as in claim 1, wherein the first parameter includes a delay time of the delay tap.

3. A method as in claim 1, wherein the first direction represents a timeline and wherein the one or more delay tap controls are oriented across the timeline.

4. A method as in claim 1, comprising receiving a manipulation of at least a portion of the delay tap controls in a manipulated direction; and setting the first or second parameter in response to the manipulation based at least in part on the manipulated direction.

5. A method as in claim 1, comprising receiving an input modifying the length of one of a group of selected delay tap controls; and modifying lengths of other delay tap controls in response to the input.

6. A method as in claim 1, comprising receiving a drawing input drawing a line across at least a portion of the delay tap controls; and adjusting the length of the at least the portion of the delay tap controls in response to the drawing input.

7. A method as in claim 1, wherein the second parameter is an output level, a frequency band, or a resonance associated with the delay tap.

8. A method as in claim 1, wherein the second parameter is a pan.

9. A method as in claim 1, wherein the second parameter is a pitch transposition.

10. A method as in claim 1, wherein the second parameter is a band pass filter.

11. A method as in claim 1, wherein the second parameter comprises a band reject filter.

12. A method as in claim 1, comprising receiving an input dragging the delay tap control along the second direction perpendicular to the first direction, and modifying the upper and lower boundaries together in response to the input.

13. A method as in claim 1, comprising receiving an input positioning the delay tap control relative to a second direction perpendicular to the first direction; and setting the second parameter in response to the input, wherein the second parameter is a frequency band cut off by a band reject filter of the delay tap.

14. A method as in claim 13, comprising receiving an input moving the delay tap control in one of the two directions perpendicular to the time line; and modifying a low pass filter cutoff frequency and a high pass filter cutoff frequency together in response to the input.

15. A method as in claim 1, comprising selecting the second parameter from a plurality of parameters.

16. A data processing system to provide a graphical user interface, comprising:

one or more input devices configured to receive user inputs configured to manipulate a first edge of a delay tap control of one or more display tap controls or a second edge of the delay tap control relative to a second direction cross-wise to the first direction;

a processor configured to process the user inputs;

a display configured to display one or more delay tap controls on a display device, wherein a position of a delay tap control along a first direction controls a first parameter of audio properties, and a length of the delay tap control that is cross-wise to the first direction controls a second parameter of audio properties, wherein the processor is configured to set the second parameter in response to the manipulation, wherein the first edge defines an upper boundary for the second parameter of the delay tap, and the second edge defines a lower boundary for the second parameter of the delay tap.

17. A data processing system as in claim 16, wherein the first parameter includes a delay time of the delay tap.

18. A data processing system as in claim 16, wherein the first direction represents a timeline and wherein the one or more delay tap controls are oriented across the timeline.

19. A data processing system as in claim 16, wherein one or more input devices are configured to receive an input manipulating at least a portion of the delay tap controls in a manipulated direction; and the processor sets the first or second parameter in response to the input based at least in part on the manipulated direction.

20. A data processing system as in claim 16, wherein the one or more input devices are configured to receive an input modifying the length of one of a group of selected delay tap controls, and the processor modifies lengths of other delay tap controls in response to the input of modifying.

21. A data processing system as in claim 16, wherein the one or more input devices are configured to receive an input drawing a line across at least a portion of the delay tap controls, and the processor adjusts the length of the at least the portion of the delay tap controls in response to the input of drawing.

22. A data processing system as in claim 16, wherein the second parameter is an output level, a frequency band, or a resonance associated with the delay tap.

23. A data processing system as in claim 16, wherein the second parameter is a pan.

24. A data processing system as in claim 16, wherein the second parameter is a pitch transposition.

25. A data processing system as in claim 16, wherein the second parameter comprises a band pass filter.

26. A data processing system as in claim 16, wherein the second parameter comprises a band reject filter.

27. A data processing system as in claim 16, wherein the one or inputs are configured to receive an input moving the delay tap control along the second direction perpendicular to the first direction, and the processor modifies the upper and lower boundaries together in response to the input.

28. A data processing system as in claim 16, wherein the one or more input devices are configured to receive an input positioning the delay tap control relative to a second direction perpendicular to the first direction, the processor sets the second parameter in response to the input, wherein the second parameter is a frequency band cut off by a band reject filter of the delay tap.

29. A data processing system as in claim 28, wherein the one or more input devices are configured to receive an input moving the delay tap control in one of the two directions perpendicular to the time line, and the processor modifies a low pass filter cutoff frequency and a high pass filter cutoff frequency together in response to the input of moving.

30. A data processing system as in claim 16, wherein the display is configured to display a plurality of parameters of audio properties, and the one or more inputs are configured to select the second parameter from a plurality of parameters.

31. A machine readable non-transitory medium containing executable instructions which when executed by a data processing system cause the data processing system to perform operations comprising:

displaying a region having a first direction;

displaying at least one geometric shape in the region, a distance specified by a position of the at least one geometric shape along the first direction determines a time delay of a signal associated with the geometric shape and wherein an aspect of the geometric shape specifies an audio parameter of the presentation of the signal associated with the geometric shape;

receiving a manipulation of a first edge of the geometric shape or a second edge of the geometric shape relative to a second direction perpendicular to the first direction; and setting the audio parameter in response to the manipulation, wherein the first edge defines an upper boundary for the audio parameter of the geometric shape, and the second edge defines a lower boundary for the audio parameter of the geometric shape.

32. A machine-readable medium as in claim 31, wherein the first direction represents time.

33. A machine-readable medium as in claim 31 wherein the at least one geometric shape is a delay tap control and wherein the aspect of the geometric shape represents an output level; a frequency of a band pass filter; a resonance of a filter; or a panning of the signal.

34. A machine-readable medium as in claim 33, comprising instructions that cause the data processing system to perform operations comprising:

receiving an input to add another geometric shape in the region, a second distance specified by a position of the another geometric shape along the first direction determining a time delay of another signal associated with the another geometric shape;

receiving an input which adjusts the aspect of the geometric shape to modify an audio parameter of the another signal.

* * * * *